(12) United States Patent
Nakano et al.

(10) Patent No.: US 10,006,599 B2
(45) Date of Patent: Jun. 26, 2018

(54) LIGHTING APPARATUS AND AUTOMOBILE INCLUDING THE SAME

(71) Applicant: PANASONIC INTELLECTUAL PROPERTY MANAGEMENT CO., LTD., Osaka (JP)

(72) Inventors: Tomoyuki Nakano, Osaka (JP); Tomoyuki Ogata, Osaka (JP); Yoshihiko Kanayama, Hyogo (JP); Makoto Kai, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 335 days.

(21) Appl. No.: 14/807,215

(22) Filed: Jul. 23, 2015

(65) Prior Publication Data

US 2016/0033103 A1 Feb. 4, 2016

(30) Foreign Application Priority Data

Jul. 30, 2014 (JP) .................................. 2014-155549

(51) Int. Cl.
*F21S 41/663* (2018.01)
*B60C 11/00* (2006.01)
(Continued)

(52) U.S. Cl.
CPC ........... *F21S 41/663* (2018.01); *B60C 11/005* (2013.01); *B60Q 1/0052* (2013.01); *B60Q 1/14* (2013.01); *B60Q 1/1415* (2013.01); *B60Q 1/18* (2013.01); *F21S 41/147* (2018.01); *F21S 41/295* (2018.01); *F21S 43/14* (2018.01); *F21S 43/19* (2018.01);
(Continued)

(58) Field of Classification Search
CPC .......... B60Q 1/14; B60Q 1/18; B60Q 1/0052; B60Q 1/1415; B60Q 11/05; B60Q 2400/30; F21S 48/115; F21S 48/211; F21S 48/215; F21S 48/328; F21S 48/1159; F21S 48/1216; F21S 48/1747; F21S 41/147;
(Continued)

(56) References Cited

U.S. PATENT DOCUMENTS 8,746,940 B2 6/2014 Kawanobe et al.
9,046,228 B2 6/2015 Tanaka et al.
(Continued)

FOREIGN PATENT DOCUMENTS

JP 2009-081087 4/2009
JP 2011-225043 11/2011
(Continued)

OTHER PUBLICATIONS

Office Action issued in Chinese family member Patent Appl. No. 201510441108.9, dated Jun. 21, 2017, along with a partial English translation thereof.
(Continued)

*Primary Examiner* — Stephen F Husar
(74) *Attorney, Agent, or Firm* — Greenblum & Bernstein, P.L.C.

(57) ABSTRACT

Lighting apparatus for a vehicle includes: night-time low beam light source which mainly illuminates a lower front region in front of the vehicle; and daytime light source which mainly illuminates an overhead region above the lower front region.

20 Claims, 8 Drawing Sheets (51) Int. Cl.
| | |
|---|---|
| *B60Q 1/00* | (2006.01) |
| *B60Q 1/14* | (2006.01) |
| *B60Q 1/18* | (2006.01) |
| *F21S 41/147* | (2018.01) |
| *F21S 41/29* | (2018.01) |
| *F21S 43/19* | (2018.01) |
| *F21S 43/14* | (2018.01) |
| *F21S 45/48* | (2018.01) |
| *F21Y 115/10* | (2016.01) |
| *F21S 45/47* | (2018.01) |

(52) U.S. Cl.
CPC .......... *F21S 45/48* (2018.01); *B60Q 2400/30* (2013.01); *F21S 45/47* (2018.01); *F21Y 2115/10* (2016.08)

(58) Field of Classification Search
CPC ........ F21S 41/295; F21S 41/663; F21S 43/14; F21S 43/19; F21S 45/47; F21S 45/48; F21Y 2115/10
See application file for complete search history.

(56) References Cited

U.S. PATENT DOCUMENTS

| | | |
|---|---|---|
| 2013/0114283 A1 | 5/2013 | Kawanobe et al. |
| 2014/0085920 A1 | 3/2014 | Meyrenaud |
| 2014/0268856 A1 | 9/2014 | Kawanobe et al. |
| 2015/0098218 A1 | 4/2015 | Kai et al. |
| 2015/0138799 A1* | 5/2015 | Schwaiger ........... F21S 48/1159 362/510 |

FOREIGN PATENT DOCUMENTS

| | | |
|---|---|---|
| JP | 2013-101881 | 5/2013 |
| JP | 2014-049274 | 3/2014 |
| JP | 2014-067714 | 4/2014 |
| WO | 2013/160588 | 10/2013 |
| WO | 2013/160588 A1 | 10/2013 |

OTHER PUBLICATIONS

U.S. Appl. No. 14/819,528 to Yoshihiko Kanayama et al., which was filed on Aug. 6, 2015.
U.S. Appl. No. 14/688,194 to Yoshihiko Kanayama et al., which was filed on Apr. 16, 2015.
U.S. Appl. No. 14/693,152 to Yoshihiko Kanayama et al., which was filed on Apr. 22, 2015.
U.S. Appl. No. 14/734,370 to Makoto Kai et al., which was filed on Jun. 9, 2015.
U.S. Appl. No. 14/706,116 to Yoshihiko Kanayama et al., which was filed on May 7, 2015.
Office Action from Japan Patent Office (JPO) in Japanese Patent Appl. No. 2014-155549, dated Jan. 30, 2018.
Office Action from Japan Patent Office (JPO) in Japanese Patent Appl. No. 2014-155549, dated Apr. 17, 2018, together with an English language translation.

* cited by examiner

FIG. 8

LIGHTING APPARATUS AND AUTOMOBILE INCLUDING THE SAME

CROSS REFERENCE TO RELATED APPLICATION

This application claims the benefit of priority of Japanese Patent Application Number 2014-155549, filed Jul. 30, 2014, the entire content of which is hereby incorporated by reference.

BACKGROUND OF THE INVENTION

1. Field of the Invention

The present disclosure relates to a lighting apparatus and an automobile including the same.

2. Description of the Related Art

Conventionally, a technique is disclosed which employs, as a light source for a low beam, a light-emitting device having a high ratio of scotopic vision luminance to photopic vision luminance (S/P ratio) for a lighting apparatus which performs night-time illumination for an automobile (see, for example, Japanese Unexamined Patent Application Publication No. 2013-101881). The above-described technique enables illuminating even the surroundings of an illuminated area with use of so-called Purkinje phenomenon, leading to faster notification in viewing the surroundings in a dark environment during night-time driving.

SUMMARY OF THE INVENTION

With the above-described conventional lighting apparatus, however, a low beam can reach only several tens of meters in front of an automobile. The area illuminated by a low beam is referred to as a low beam illuminated area. It is not sufficient for safe driving to just illuminate the low beam illuminated area of only a small distance.

In order to drive sufficiently safely, it is important for a driver to instantaneously notice a driving environment in a greater distance. If a driver can notice that there is a person or a fallen object in a distance, for example, the driver is allowed to address the situation well in advance for the object to watch out for, such as the person or the fallen object.

In view of the above, an object of the present disclosure is to provide a lighting apparatus capable of increasing night-time visibility at a distance, and an automobile including the lighting apparatus.

In order to achieve the above-described object, a lighting apparatus according to an aspect of the present disclosure is a lighting apparatus for a vehicle, which includes: a night-time low beam light source which mainly illuminates a lower front region in front of the vehicle; and a daytime light source which mainly illuminates an overhead region that is an upper region above the lower front region.

According to the present disclosure, it is possible to provide a lighting apparatus capable of increasing night-time visibility at a distance, and an automobile including the lighting apparatus.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE PREFERRED EMBODIMENTS

Hereinafter, a lighting apparatus and an automobile according to an embodiment of the present disclosure are described in detail with reference to the accompanying drawings. It should be noted that each example in the subsequently-described embodiment show a specific preferred example of the present disclosure. Therefore, the numerical values, shapes, materials, structural elements, arrangement and connection of the structural elements, etc., shown in the following embodiment are mere examples, and are not intended to limit the present disclosure. Consequently, among the structural elements in the following embodiment, elements not recited in any one of the independent claims which indicate the broadest concepts of the present disclosure are described as arbitrary structural elements.

As described herein, "front" and "forward" refer to the direction in which light is emitted from the lighting apparatus (i.e., the light-emitting direction) and the light-extraction direction in which light is extracted, and "back" and "behind" refer to the direction opposite the front/forward direction. Furthermore, "front" and "forward" refer to the direction of travel when an automobile moves forward, "right" and "left" are from the perspective of the driver of the automobile, "upper", "up", "upward", and "above" refer to the direction toward the ceiling of the automobile, and "lower", "down", "downward", and "below" refer to the direction opposite the up/upward/above direction. Additionally, the Z axis corresponds to the anteroposterior directions, the Y axis corresponds to the up and down (vertical) directions, and the X axis corresponds to the left and right (horizontal, lateral) directions.

In addition, the respective diagrams are schematic diagrams and are not necessarily precise illustrations. Additionally, like structural elements share the same reference numbers.

Embodiment

Figure 1:
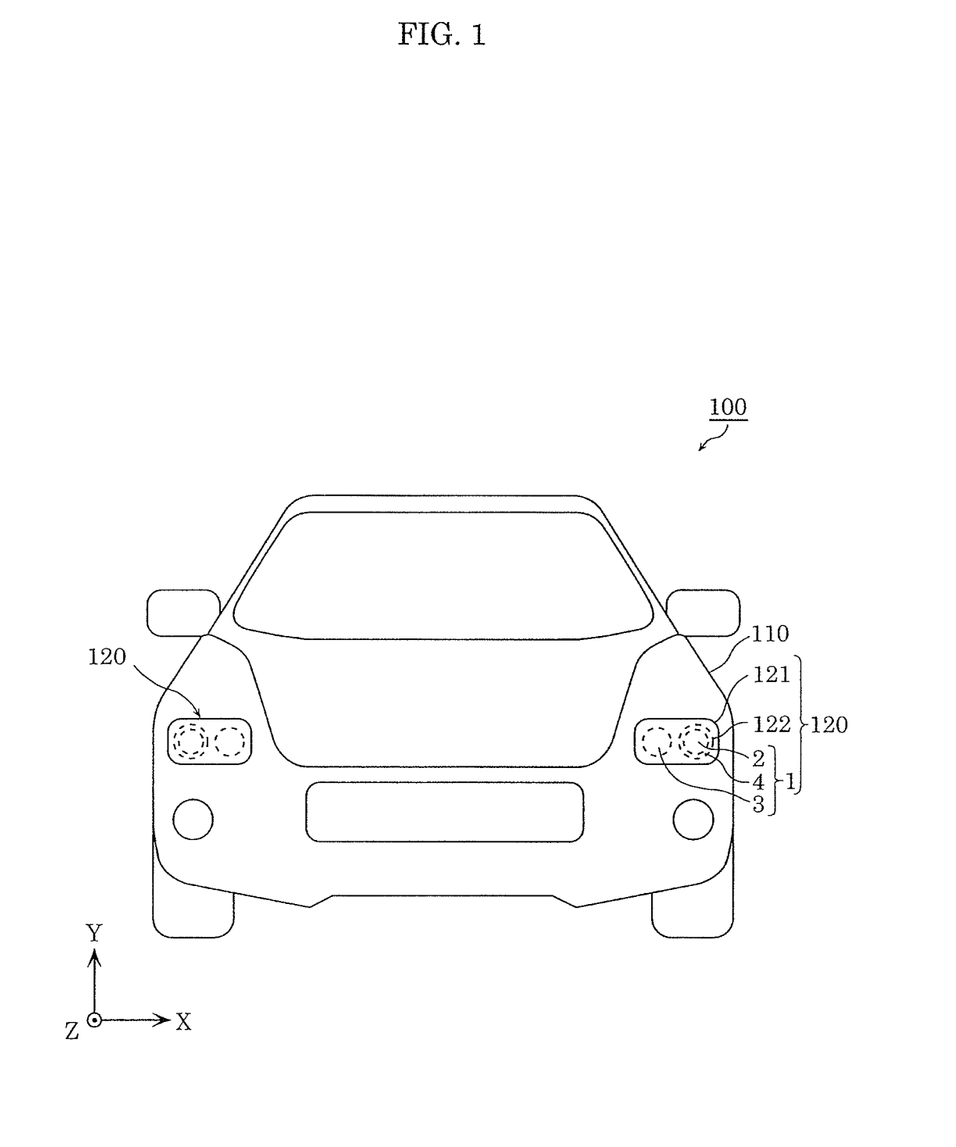
FIG. 1 is a front view of an automobile according to an embodiment of the present disclosure.

First, automobile 100 according to an embodiment will be described with reference to FIG. 1. FIG. 1 is a front view of automobile 100 according to the embodiment.

As illustrated in FIG. 1, automobile 100 according to the embodiment is one example of a vehicle, such as a four-wheeled automobile, and includes vehicle body 110 and a pair of headlights 120 disposed on the left and right sides of the front of vehicle body 110. Automobile 100 is, for example, an automobile propelled by a gasoline engine or an automobile propelled by an electric engine In the embodiment, headlights 120 are lamp fittings, and are headlight assemblies (vehicular headlights) used in a vehicle and include housing 121, front cover 122, and lighting apparatus 1 that is attached to housing 121 behind front cover 122.

Housing 121 is, for example, a metal chassis and has an opening from which light emitted from lighting apparatus 1 exits. Front cover 122 is a headlight cover that transmits light and covers the opening of housing 121. Housing 121 and front cover 122 are sealed together so as to keep water and dust from entering housing 121.

Lighting apparatus 1 is disposed behind front cover 122 and attached to housing 121. The light emitted by lighting apparatus 1 transmits through front cover 122 and travels outward. As illustrated in FIG. 1, lighting apparatus 1 includes, as a lamp fitting: night-time low beam light source 2; night-time high beam light source 3; and daytime light source 4.

Lighting Apparatus

Figure 2:
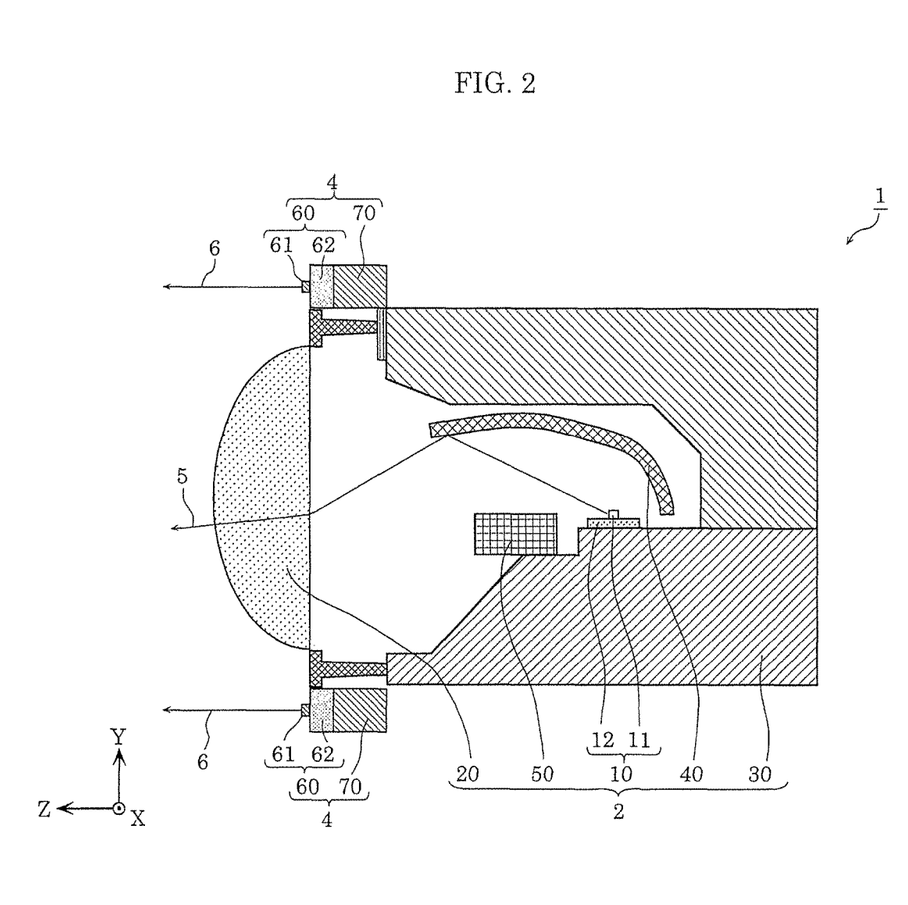
FIG. 2 is a cross-sectional view illustrating a lighting apparatus according to the embodiment of the present disclosure.
Figure 3:
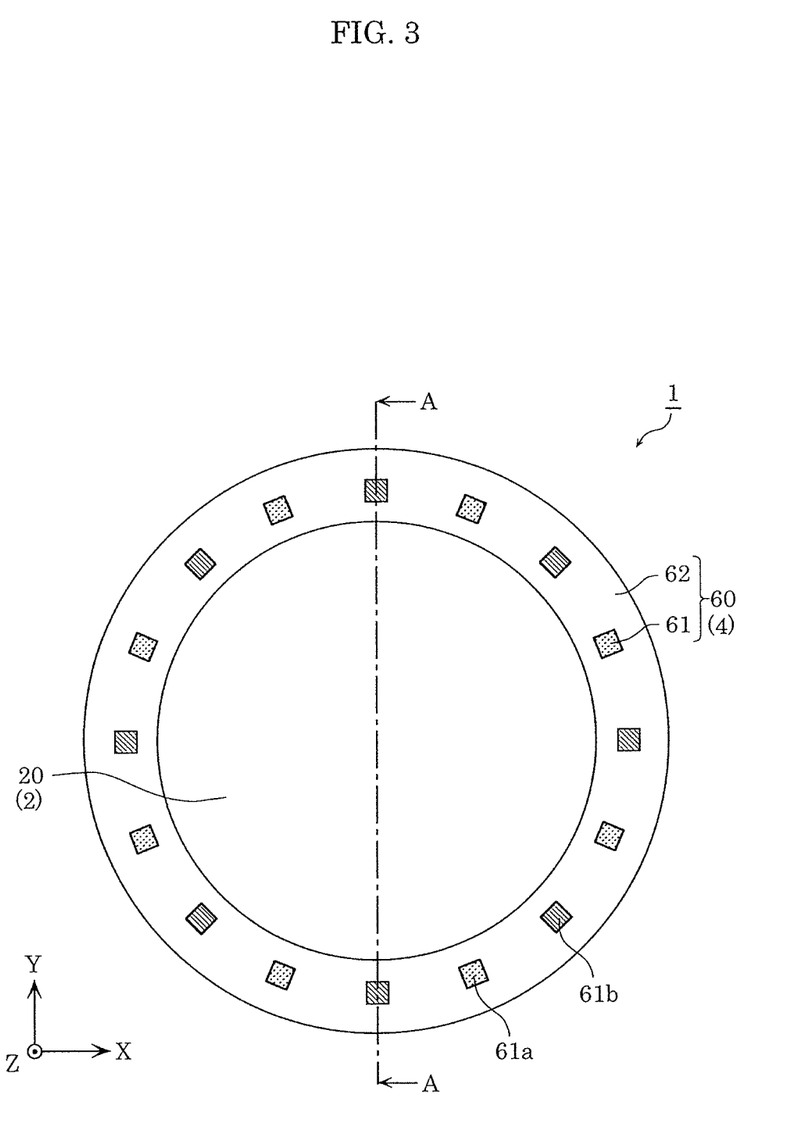
FIG. 3 is a front view of the lighting apparatus according to the embodiment of the present disclosure.

Next, lighting apparatus 1 according to the embodiment will be described with reference to FIG. 1 through FIG. 3. FIG. 2 is a cross-sectional view illustrating lighting apparatus 1 according to the embodiment. FIG. 3 is a front view of lighting apparatus 1 according to the embodiment. FIG. 2 is a cross sectional view of lighting apparatus 1 taken at the center of lighting apparatus 1 (specifically, line A-A shown in FIG. 3). In addition, FIG. 3 illustrates night-time low beam light source 2 and daytime light source 4 which are integrally formed, and night-time high beam light source 3 is not illustrated in FIG. 3.

Lighting apparatus 1 is a vehicular lighting apparatus used for a headlight in the vehicle, for example. According to the embodiment, lighting apparatus 1 emits light forward from vehicle body 110 illustrated in FIG. 1.

Night-time low beam light source 2 is an optical system for producing a low beam which is a dipped beam, and produces and emits low beam 5 having a predetermined light distribution pattern. Night-time low beam light source 2 emits low beam 5, thereby illuminating mainly a lower front region that is a lower region in front of the vehicle. As illustrated in FIG. 1 to FIG. 3, night-time low beam light source 2 and daytime light source 4 are integrally formed.

Night-time low beam light source 2 includes: low beam light-emitting module 10; lens body 20; main body case 30; reflector 40; and shield 50, as illustrated in FIG. 2. The structural elements will each be described later.

Night-time low beam light source 3 is an optical system for producing a high beam which is a main beam, and produces and emits a high beam having a predetermined light distribution pattern. Night-time high beam light source 3 emits a high beam, thereby illuminating mainly a distant region in front of the vehicle. As illustrated in FIG. 1, night-time high beam light source 3 is formed separately from night-time low beam light source 2 and daytime light source 4.

Night-time low beam light source 2 and night-time high beam light source 3 are turned on mainly during night-time. In addition, night-time low beam light source 2 and night-time high beam light source 3 may also be turned on while automobile 100 drives through a tunnel, for example. More specifically, night-time low beam light source 2 and night-time high beam light source 3 are turned on not only during night-time but also when luminance in a surrounding environment of automobile 100 is low. For example, night-time low beam light source 2 and night-time high beam light source 3 are turned on in an environment of the mesopic vision (0.001 cd/m$^2$ to 10 cd/m$^2$) or the scotopic vision (0.001 cd/m$^2$ or lower). Night-time low beam light source 2 and night-time high beam light source 3 are turned on by receiving an operation of a driver, for example. It is possible to improve the visibility of the driver by turning on night-time low beam light source 2 and night-time high beam light source 3.

Daytime light source 4 is, for example, a daytime running light (DRL) to be turned on in the daytime when it is bright, for example. More specifically, daytime light source 4 is a light source which is turned on for allowing an oncoming vehicle, a pedestrian, or the like to more clearly notice the presence of automobile 100; that is, for improving the visibility. According to the embodiment, daytime light source 4 has a feature in that daytime light source 4 is turned on also when night-time low beam light source 2 is ON (specifically, during night-time).

Daytime light source 4 is disposed on at least part of a periphery of night-time low beam light source 2. According to the embodiment, daytime light source 4 has a loop shape in a front view and disposed at positions to surround night-time low beam light source 2 as illustrated in FIG. 3. More specifically, daytime light source 4 has an annular shape in a front view, night-time low beam light source 2 has a circular shape in a front view, and daytime light source 4 and night-time low beam light source 2 are arranged concentrically.

Daytime light source 4 produces and emits daylight beam 6. Daytime light source 4 emits daylight beam 6, thereby illuminating mainly an overhead region that is an upper region above the lower front region in front of the vehicle. As illustrated in FIG. 2 and FIG. 3, daytime light source 4 includes daylight light-emitting module 60 and support 70.

The following describes each of the structural elements in detail.

Light Emitting Module

Low beam light-emitting module 10 is an LED (light emitting diode) module for producing a low beam, and turned on when illuminating the lower front region, specifically, a road surface.

Low beam light-emitting module 10 is fixed to main body case 30. More specifically, substrate 12 is mounted and fixed to a predetermined mounting surface on main body case 30. Moreover, in the embodiment, substrate 12 is arranged laying flat (i.e., horizontally) so that low beam light-emitting module 10 projects light in an upward direction, as illustrated in FIG. 2. In other words, the optical axis of low beam light-emitting module 10 (low beam light-emitting device 11) is parallel to the Y axis.

As illustrated in FIG. 2, low beam light-emitting module 10 includes low beam light-emitting device 11 and substrate 12 on which low beam light-emitting device 11 is mounted. Low beam light-emitting device 11 is a light-emitting device which emits light that passes through lens body 20. More specifically, low beam light-emitting device 11 emits light when projecting low beam 5.

Daylight light-emitting module 60 includes: daylight light-emitting device 61 and substrate 62 on which daylight light-emitting device 61 is mounted. Daylight light-emitting device 61 emits light when projecting daylight beam 6. As illustrated in FIG. 3, daylight light-emitting device 61 is disposed at a plurality of locations to surround lens body 20 in an annular shape in a front view.

Daylight light-emitting module 60 is fixed to support 70. More specifically, substrate 62 is mounted and fixed to a predetermined mounting surface on support 70. Moreover, in the embodiment, substrate 62 is arranged laying standing (i.e., vertically) so that daylight light-emitting module 60 projects light in a forward direction as illustrated in FIG. 2. In other words, the optical axis of daylight light-emitting module 60 (daylight light-emitting device 61) is parallel to the Z axis.

Low beam light-emitting module 10 and daylight light-emitting module 60 are, for example, white light sources, such as B-Y white LED light sources that use a blue LED chip that emits blue light and a yellow phosphor so as to emit white light. Alternatively, low beam light-emitting module 10 and daylight light-emitting module 60 may be white LED light sources or the like that use an LED chip that emits blue light, an LED chip that emits red light, and an LED chip that emits green light so as to collectively emit white light.

Moreover, low beam light-emitting module 10 and daylight light-emitting module 60 may be surface mount device (SMD) modules, and alternatively may be chip on board (COB) modules.

When low beam light-emitting module 10 and daylight light-emitting module 60 are SMD modules, low beam light-emitting device 11 and daylight light-emitting device 61 are each an SMD LED device that has an LED chip (bare chip) mounted and sealed with a sealant (phosphor-containing resin) in a resin package, for example. When low beam light-emitting module 10 and daylight light-emitting module 60 are COB modules, low beam light-emitting device 11 and daylight light-emitting device 61 are each an LED chip (bare chip) itself, and are each directly mounted on substrate 12 and substrate 62, respectively. In this case, the LED chips mounted on substrate 12 and substrate 62 are sealed with a sealant such as a phosphor-containing resin.

Substrate 12 and substrate 62 are, for example, ceramic substrates made of, for example, ceramics such as alumina, resin substrates made of resin, or insulated metal substrates consisting of a metal baseplate covered by a layer of insulating material. Substrate 12 has a shape in plan view corresponding to the shape of the mounting surface of main body case 30 to which substrate 12 is mounted. In addition, substrate 62 has an annular shape in plan view as illustrated in FIG. 3.

Lens Body

Lens body 20 is disposed in front of low beam light-emitting module 10 and shield 50. More specifically, lens body 20 is disposed so as to cover an opening of main body case 30.

Lens body 20 can be made by, for example, injection molding using a clear resin such as acryl, polycarbonate, or cyclic olefin. For example, lens body 20 has the shape of a half slice of a sphere or oval sphere. Light emitted upward by low beam light-emitting device 11 is reflected off reflector 40 and enters lens body 20. The optical properties of lens body 20 direct the light to exit forward from the front surface (curved surface) of lens body 20.

Main Body Case

Main body case 30 is a tubular case in which low beam light-emitting module 10, reflector 40, and shield 50 are disposed as illustrated in FIG. 2.

Main body case 30 is a heat dissipating component for dissipating heat generated by low beam light-emitting module 10, for example, to the outside (atmosphere). Consequently, main body case 30 is made of, for example, a material having a high thermal conductivity, such as metal. Main body case 30 is, for example, an aluminum die cast case made from aluminum alloy. Main body case 30 is, specifically, a heat sink provided with a plurality of cooling fins (not illustrated).

Reflector

Reflector 40 is disposed above low beam light-emitting module 10 in main body case 30. Reflector 40 has a curved reflective surface so as to reflect light, which is emitted in an upward direction by low beam light emitting module 10, forward at a downward sloping angle toward lens body 20 to cause the light to enter lens body 20.

Reflector 40 is formed by resin molding using high-temperature resin and the surface is given specular finish, for example. For example, reflector 40 is formed by forming a metal deposition film (for example, an aluminum deposition film) on a surface of a portion of a resin molded body included in reflector 40. It is to be noted that reflector 40 may be formed integrally with main body case 30. In other words, reflector 40 may be a portion which is included in an inner face of main body case 30 and is given specular finish.

Shield

Shield 50 is for defining a predetermined cut-off line that is a predetermined brightness boundary line. Shield 50 defines the predetermined cut-off line by shielding a portion of the light emitted by low beam light-emitting module 10. Shield 50 is disposed inside main body case 30. Shield 50 may be formed by resin molding using a high-temperature resin, for example. It should be noted that shield 50 may be metal instead of resin. Shield 50 may be formed, for example, integrally with main body case 30.

Support

Support 70 is a base which has a loop shape and supports daylight light-emitting module 60. Support 70 is fixed to main body case 30 according to the embodiment. More specifically, support 70 is disposed so as to cover a periphery of a portion that is part of main body case 30 and holds lens body 20. It is to be noted that support 70 may be formed, for example, integrally with main body case 30.

Support 70 is a heat dissipating component for dissipating heat generated by daylight light-emitting module 60, for example, to the outside. Consequently, support 70 is made of, for example, a material having a high thermal conductivity, such as metal. Support 70 is, for example, an aluminum die cast support made from aluminum alloy.

Details of the Daytime Light Source and an Illuminated Area Thereof

The following describes the details of daytime light source 4 and an illuminated area thereof according to the embodiment, with reference to FIG. 3.

According to the embodiment, daytime light source 4 has the S/P ratio which is at least 2.0. The S/P ratio will be described first below.

The S/P ratio is a ratio of a scotopic sensitivity to a photopic sensitivity. The photopic sensitivity is obtained by multiplying a spectrum of a light source by relative spectral sensitivity in photopic vision, and scotopic sensitivity is obtained by multiplying a spectrum of a light source by relative spectral sensitivity in scotopic vision.

The relative spectral sensitivity of human eyes varies with brightness of the surrounding environment. The relative spectral sensitivity is a numerical value indicating intensity of brightness that human eyes perceive for each wavelength of light.

Figure 4:
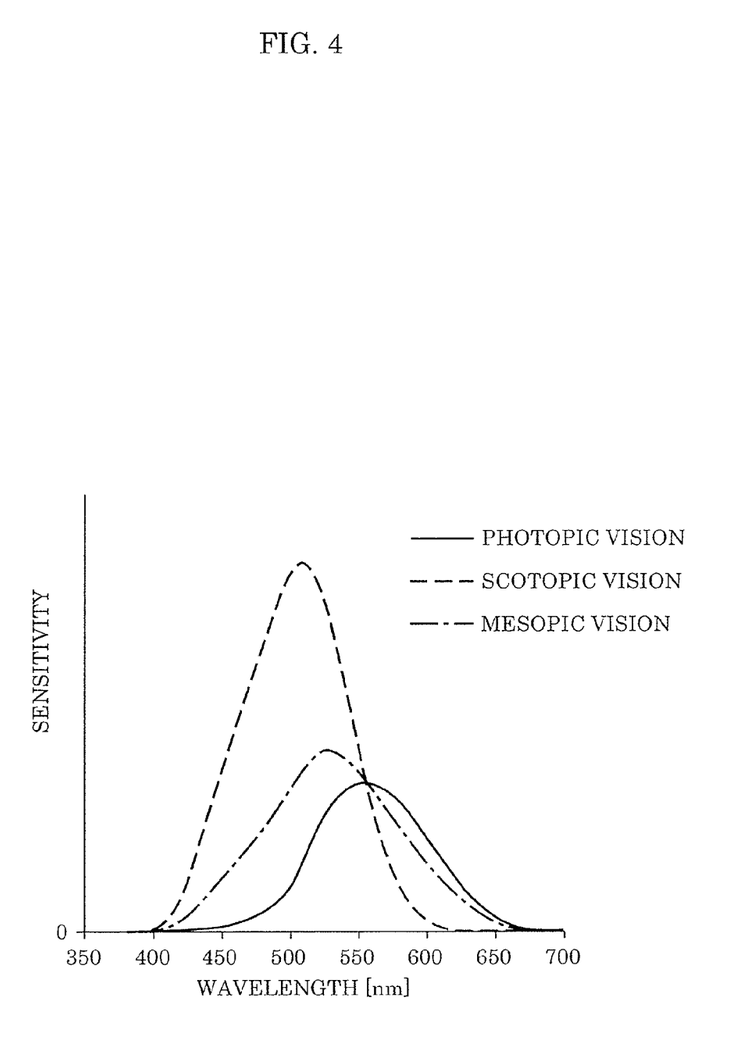
FIG. 4 is a diagram illustrating a relative spectral sensitivity curve of each of photopic vision, scotopic vision, and mesopic vision, according to the embodiment of the present disclosure.

FIG. 4 is a diagram illustrating a relative spectral sensitivity curve of each of photopic vision, scotopic vision, and mesopic vision.

As illustrated in FIG. 4, as the brightness in a surrounding environment decreases, a peak of the relative spectral sensitivity shifts to the short wavelength side as relatively showing an increase. This is called Purkinje phenomenon. For example, a peak of approximately 683 lm/W is present at approximately 555 nm in photopic vision, whereas a peak of approximately 1699 lm/W is present at approximately 507 nm in scotopic vision.

Figure 5:
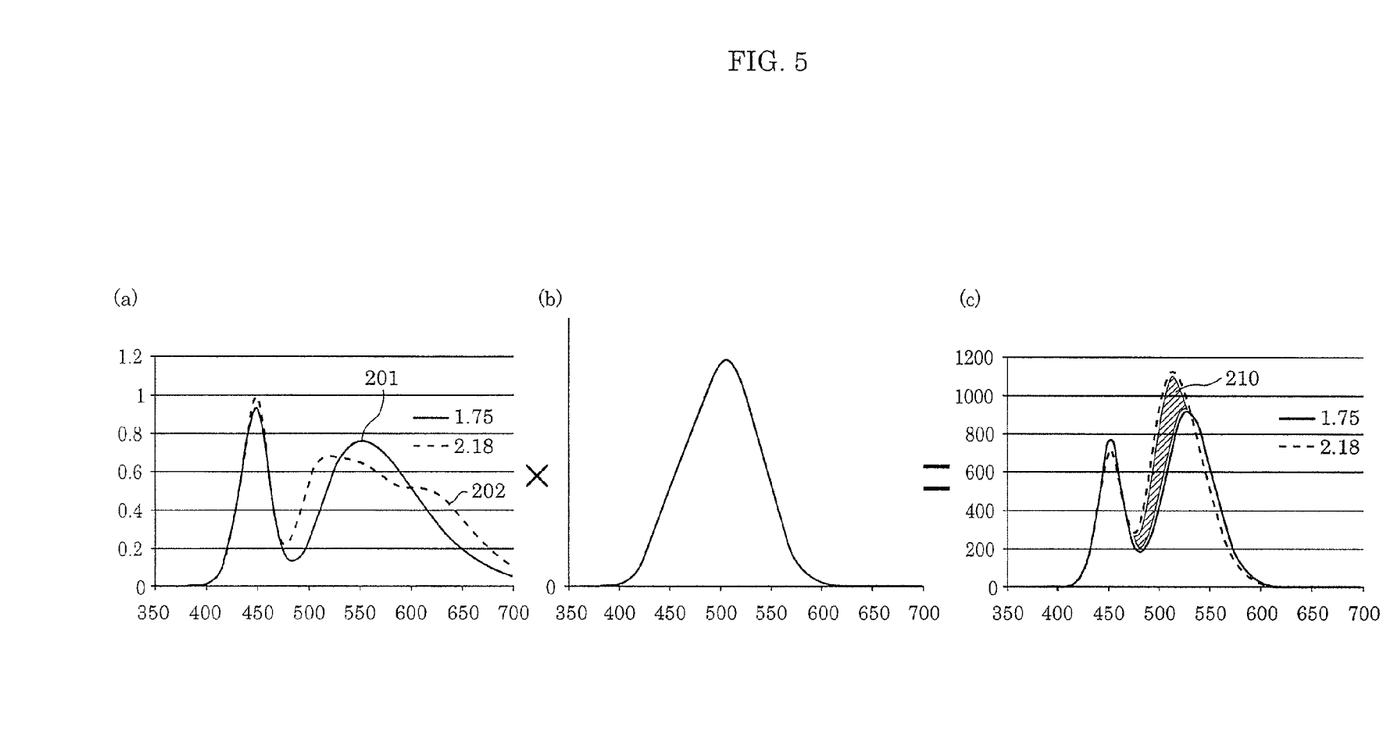
FIG. 5 is a diagram for explaining that humans perceive, in scotopic vision, more brightness to light emitted from a light source having a high S/P ratio according to the embodiment of the present disclosure.

FIG. 5 is a diagram for explaining that humans perceive more brightness to light emitted from a light source having a high S/P ratio in scotopic vision. More specifically, (a) in FIG. 5 illustrates a spectrum of first light 201 emitted from a light source having an S/P ratio of 1.75, and a spectrum of second light 202 emitted from a light source having an S/P ratio of 2.18. (b) in FIG. 5 illustrates a relative spectral sensitivity curve in scotopic vision. (c) in FIG. 5 indicates brightness that humans perceive in scotopic The brightness that human eyes perceive ((c) in FIG. 5) is expressed by a result of multiplying the spectrum of light emitted from a light source ((a) in FIG. 5) by the relative spectral sensitivity curve ((b) in FIG. 5). Accordingly, as illustrated by (c) in FIG. 5, human eyes perceive, in scotopic vision, second light 202 as brighter than first light 201 by the amount of region 210.

Accordingly, when light is emitted from a light source having a high S/P ratio, Purkinje phenomenon allows human eyes to perceive the light as brighter in scotopic vision. More specifically, since the S/P ratio of daytime light source 4 is at least 2.0 in the embodiment, human eyes can perceive more brightness when daytime light source 4 is turned on in a low-light condition such as during night-time.

Figure 6:
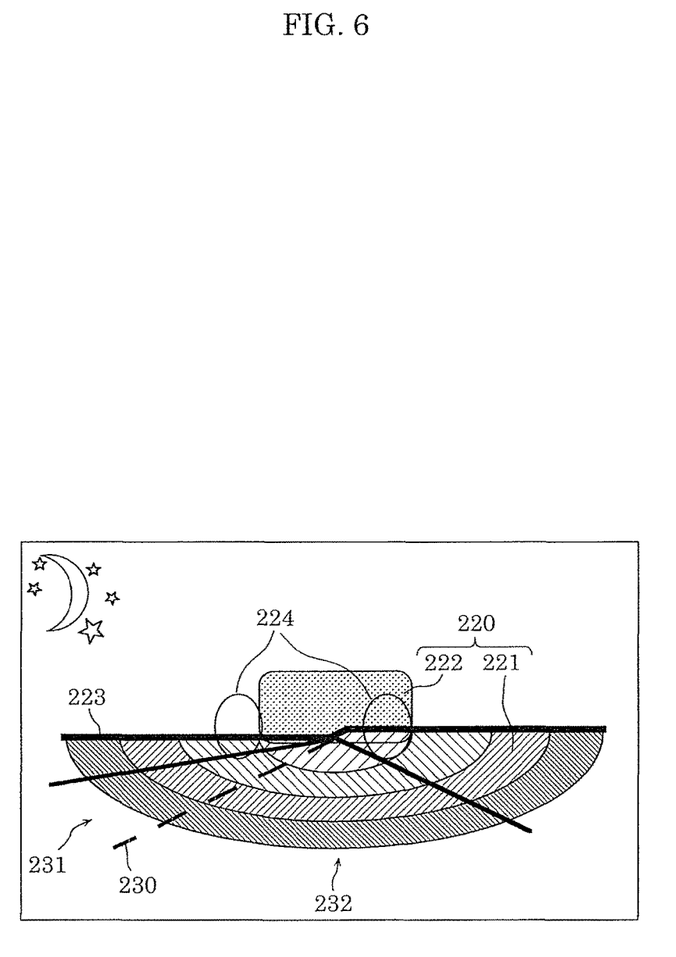
FIG. 6 is a diagram illustrating an illuminated area when the lighting apparatus according to the embodiment of the present disclosure is turned on during night-time.

FIG. 6 is a diagram illustrating illuminated area 220 when lighting apparatus 1 according to the embodiment is turned on during night-time. More specifically, FIG. 6 illustrates illuminated area 220 when night-time low beam light source 2 is ON.

Illuminated area 220 illustrated in FIG. 6 is an illuminated area in countries where automobile 100 keeps to the right side on the street (the U. S., for example). More specifically, the left side of center line 230 is oncoming lane 231, and the right side of center line 230 is driving lane 232.

Illuminated area 220 includes low beam illuminated area 221 and overhead illuminated area 222.

Low beam illuminated area 221 is a lower front region in front of a vehicle, which is illuminated with low beam 5 emitted from night-time low beam light source 2. More specifically, low beam illuminated area 221 is a region mainly includes a road surface in front of a vehicle, and is a region positioned lower than cut-off line 223. Cut-off line 223 prevents an illuminated area from being created above the horizon in oncoming lane 231. With this, it is possible to avoid providing inadvertent glare to a driver of an oncoming vehicle.

Overhead illuminated area 222 is a region above low beam illuminated area 221. Specifically, overhead illuminated area 222 is a distant region in front of a vehicle as illustrated in FIG. 6. More specifically, overhead illuminated area 222 includes a region above cut-off line 223. Overhead illuminated area 222 may partially overlap low beam illuminated area 221.

Overhead illuminated area 222 is a region illuminated with daylight beam 6 emitted from daytime light source 4. Accordingly, light with which overhead illuminated area 222 is illuminated is light emitted from a light source having a high S/P ratio. For that reason, overhead illuminated area 222 and an area near overhead illuminated area 222 are perceived as brighter to human eyes.

For example, distant road shoulder regions 224 in front of automobile 100 is each a region in or near overhead illuminated area 222. For that reason, road shoulder regions 224 are perceived as brighter to human eyes (eyes of a driver).

When automobile 100 drives in an urban area or the like, automobile 100 usually drives not with a high beam but with a low beam because it is highly likely that an oncoming vehicle or a pedestrian appear frequently. When a low beam is emitted, road shoulder region 224, for example, is not sufficiently bright without overhead illuminated area 222 according to the embodiment. For that reason, the visibility at a distance is low, and thus sufficiently safe driving cannot be achieved.

In contrast, according to the embodiment, Purkinje phenomenon allows road shoulder region 224 to look bright to the driver as described above. As described above, since it is possible to increase the visibility at a distance, a driver can drive more safely.

It is specified that an area (overhead illuminated area 222 in the embodiment) illuminated with daylight beam 6 by daytime light source 4 is from 25 $cm^2$ to 200 $cm^2$ inclusive according to European regulations, for example. As described above, daytime light source 4 needs to comply with predetermined regulations according to a country or an area in which daytime light source 4 is used.

Moreover, daytime light source 4 has a function of modulating light according to the embodiment. More specifically, daytime light source 4 emits less light when night-time low beam light source 2 is ON than when night-time low beam light source 2 is OFF. To put it simply, daytime light source 4 emits less light during night-time than during daytime. Specifically, as illustrated in FIG. 3, daylight light-emitting devices 61 include first light-emitting device 61a and second light-emitting device 61b. More specifically, first light-emitting device 61a and second light-emitting device 61b are alternately disposed at regular intervals.

First light-emitting device 61a emits light when daylight beam 6 is emitted. First light-emitting device 61a does not emit light when night-time low beam light source 2 is ON. To put it simply, first light-emitting device 61a emits light only during daytime.

Second light-emitting device 61b emits light when night-time low beam light source 2 is ON. It is to be noted that second light-emitting device 61b emits light also when daylight beam 6 is emitted. To put it simply, second light-emitting device 61b emits light both during daytime and during night-time. Second light-emitting device 61b may emit light only during night-time.

With this, daytime light source 4 is capable of emitting less light when night-time low beam light source 2 is ON than when night-time low beam light source 2 is OFF.

Moreover, second light-emitting device 61b has the S/P ratio higher than the S/P ratio of first light-emitting device 61a. For example, second light-emitting device 61b emits second light 202 illustrated by (a) in FIG. 5, and first light-emitting device 61a emits first light 201 illustrated by (a) in FIG. 5.

For example, first light-emitting device 61a is a white LED including a blue LED chip which emits blue light composed mainly of a wavelength of 450 nm and YAG yellow phosphor. First light-emitting device 61a has the S/P ratio of 1.75, for example. The light emitted from first light-emitting device 61a has a color temperature of approximately 5000 K (so-called daylight white), for example.

Meanwhile, second light-emitting device 61b is a white LED including a blue LED chip which emits blue light composed mainly of a wavelength of 450 nm, LAG yellow phosphor, and SCASN yellow phosphor. Second light-emitting device 61b has the S/P ratio of 2.18, for example. The light emitted from second light-emitting device 61b has a color temperature of approximately 8000 K (so-called bright light color, or Akalumina white color), for example.

With the configuration described above, light is emitted from second light-emitting device 61b having a high S/P ratio during night-time, and thus it is possible to increase the visibility at a distance in front of a vehicle during night-time.

Functional Configuration of Lighting Apparatus

Figure 7:
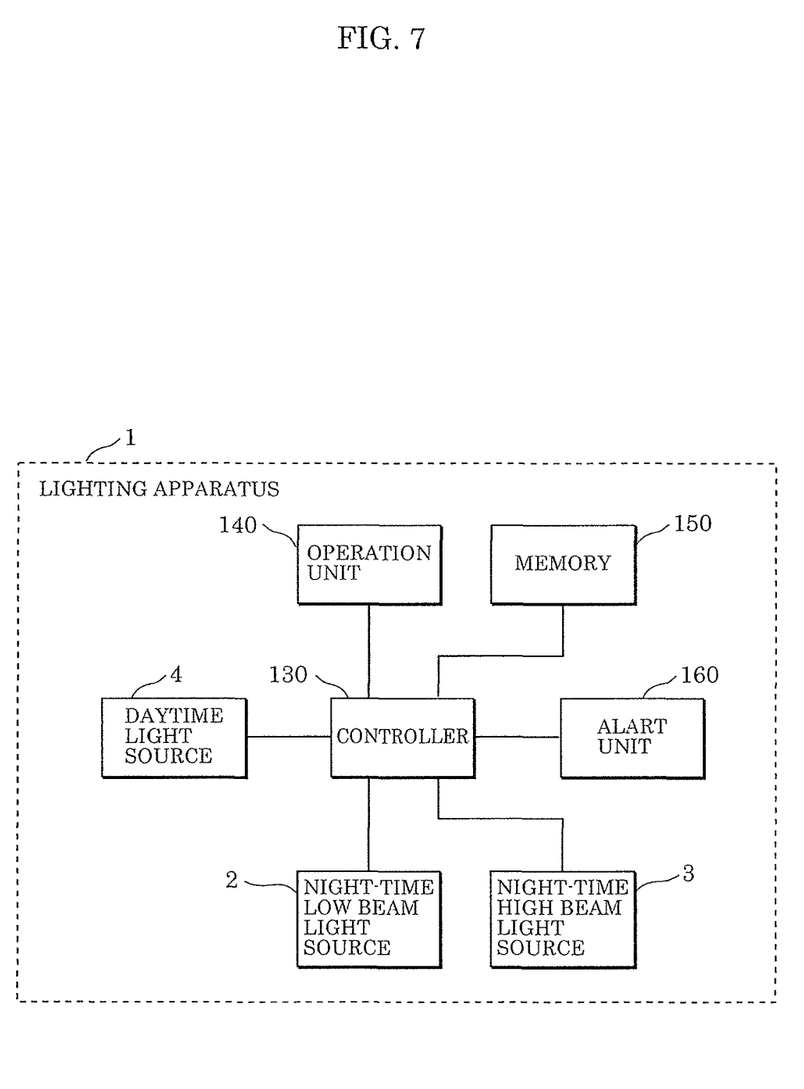
FIG. 7 is a block diagram illustrating a configuration of the lighting apparatus according to the embodiment of the present disclosure.

Next, a functional configuration of lighting apparatus 1 according to the embodiment will be described with reference to FIG. 7. FIG. 7 is a block diagram illustrating a configuration of lighting apparatus 1 according to the embodiment.

As illustrated in FIG. 7, lighting apparatus 1 includes: night-time low beam light source 2; night-time high beam light source 3; daytime light source 4; controller 130; operation unit 140; memory 150; and alert unit 160. It is to be noted that night-time low beam light source 2, night-time high beam light source 3, and daytime light source 4 are as described above, and thus description will be omitted below.

Controller 130 controls turning on and off of night-time low beam light source 2, night-time high beam light source 3, and daytime light source 4. In addition, controller 130 is connected to an engine which is not illustrated, and controls an operation of automobile 100. More specifically, controller 130 has functions of an engine control unit (ECU) and a lighting control unit.

According to the embodiment, controller 130 turns on daytime light source 4 when night-time low beam light source 2 is ON. More specifically, controller 130 turns on daytime light source 4 with a smaller amount of light when night-time low beam light source 2 is ON than when night-time low beam light source 2 is OFF. To put it simply, daytime light source 4 emits daylight beam 6 during night-time with a smaller amount of light than an amount of light emitted during daytime, in response to control by controller 130. For example, controller 130 causes only second light-emitting device 61b to emit light when night-time low beam light source 2 is ON, and causes both of first light-emitting device 61a and second light-emitting device 61b to emit light when night-time low beam light source 2 is OFF.

Operation unit 140 operates turning on and off of lighting apparatus 1 via controller 130. More specifically, operation unit 140 receives an operation instruction from a driver, and operates turning on and off of night-time low beam light source 2 and night-time high beam light source 3 based on the operation instruction.

Memory 150 stores, for example, an operation program, etc. Memory 150 is a storage such as a ROM (read only memory). The operation program is, for example, a program for controlling an operation related to turning on and off of lighting apparatus 1, an operation related to driving of automobile 100, etc.

Alert unit 160 alerts a driver to a malfunction of automobile 100. According to the embodiment, alert unit 160 provides an alert to a driver of the automobile in the case where the daytime light source 4 is OFF when the night-time low beam light source 2 is ON. For example, alert unit 160 alerts the driver that daytime light source 4 is OFF when night-time low beam light source 2 is ON. Alternatively, alert unit 160 may alert the driver to a malfunction of daytime light source 4. More specifically, alert unit 160 is an alarm unit which sets off an alarm, and alerts the driver by producing an alarm sound or the like. Alert unit 160 may be a display unit which visually alerts a driver, for example. In addition, alert unit 160 may alert a driver of the case where night-time low beam light source 2 fails to emit light when night-time low beam light source 2 is intended to emit light.

Controller 130, operation unit 140, memory 150, and alert unit 160 may include, for example, a CPU (central processing unit), a recording medium such as a ROM in which a control program is stored, a work storage such as a RAM (random access memory), a communication circuit, etc., although they are not illustrated.

Lighting Operation

Figure 8:
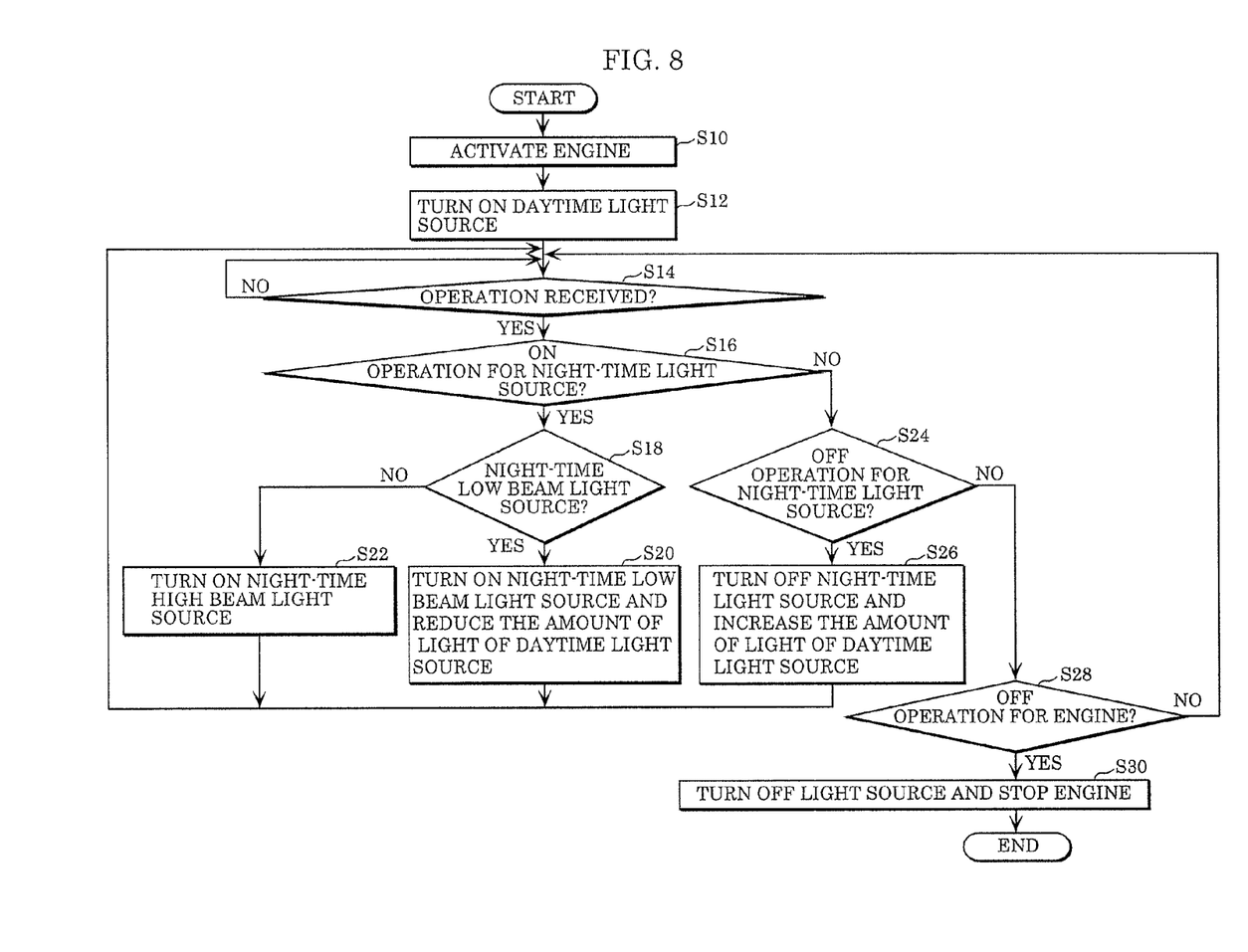
FIG. 8 is a flowchart illustrating an operation related mainly to turning on and off of the lighting apparatus, among operations of the automobile according to the embodiment of the present disclosure.

Next, among operations of automobile 100 according to the embodiment, an operation related mainly to turning on and off of lighting apparatus 1 will be described with reference to FIG. 8. FIG. 8 is a flowchart illustrating an operation related mainly to turning on and off of lighting apparatus 1, among operations of automobile 100 according to the embodiment.

First, controller 130 activates the engine of automobile 100 based on an instruction received by operation unit 140 (S10). Next, controller 130 turns on daytime light source 4 (S12). More specifically, controller 130 turns on daytime light source 4 by causing both of first light-emitting device 61a and second light-emitting device 61b to emit light.

As described above, according to the embodiment, daytime light source 4 is always turned on when the engine is activated. With this, it is possible to prevent neglecting to turn on daytime light source 4, and improve the visibility of automobile 100.

The next operation will be on hold until operation unit 140 receives a predetermined operation (No in S14). When operation unit 140 receives a predetermined operation (Yes in S14), control unit 130 determines whether or not the received operation is an ON operation (lighting instruction) for the night-time light source (S16). For example, when automobile 100 drives during night-time or in a tunnel or the like, a driver turns on the night-time light source.

When the received operation is the ON operation for the night-time light source (Yes in S16), controller 130 determines whether the received ON operation is an ON operation for night-time low beam light source 2 or for night-time high beam light source 3 (S18). When the received operation is the ON operation for night-time low beam light source 2 (Yes in S18), controller 130 turns on night-time low beam light source 2 and causes daytime light source 4 to emit less light (S20). For example, controller 130 turns off first light-emitting device 61a and turns on only second light-emitting device 61b. Then, the process goes back to Step S14, and the next operation will be on hold until another operation instruction is received.

When the received operation is the ON operation for night-time high beam light source 3 (No in S18), controller 130 turns on night-time high beam light source 3 (S22). At this time, daytime light source 4 may be caused to emit less light or may be turned off. Then, the process goes back to Step S14, and the next operation will be on hold until another operation instruction is received.

When the received operation is not the ON operation for the night-time light source (No in S16), controller 130 determines whether or not the received operation is an OFF operation for the night-time light source (S24). When the received operation is the OFF operation for the night-time light source (Yes in S24), controller 130 turns off the night-time light source, and causes daytime light source 4 to emit more light (S26). More specifically, controller 130 turns off both night-time low beam light source 2 and night-time high beam light source 3, and causes daytime light source 4 to emit more light. For example, controller 130 causes daytime light source 4 to emit more light by causing both of first light-emitting device 61a and second light-emitting device 61b to emit light. The OFF operation for the night-time light source is performed when automobile 100 exits from a tunnel or the like, for example. Then, the process goes back to Step S14, and the next operation will be on hold until another operation instruction is received.

When the received operation is not the OFF operation for the night-time light source (No in S24), controller 130 determines whether or not the received operation is an OFF operation for the engine (S28). When the received operation is the OFF operation for the engine (Yes in S28), all of the light sources which are ON are turned off, and the engine of automobile 100 is stopped (S30). With this, it is possible to prevent wasting the battery, for example, due to neglecting to turn off the light source.

When the received operation is not the OFF operation for the engine (No in S28), the process goes back to Step S14 after performing a suitable operation, and the next operation will be on hold until another operation instruction is received.

When daytime light source 4 fails to emit light when night-time low beam light source 2 is turned on in Step S20, controller 130 alerts the driver accordingly via alert unit 160. More specifically, alert unit 160 sets off an alarm based on a control by controller 130. With this, it is possible to alert the driver to a malfunction of daytime light source 4.

CONCLUSION

As described above, lighting apparatus 1 according to the embodiment is lighting apparatus 1 for vehicles, and includes: night-time low beam light source 2 which mainly illuminates low beam illuminated area 221 that is a lower front region in front of a vehicle; and a daytime light source 4 which mainly illuminates overhead illuminated area 222 that is an upper region above low beam illuminated area 221. Furthermore, automobile 100 according to the embodiment includes lighting apparatus 1, and vehicle body 110 including lighting apparatus 1 in a front portion.

With this, daytime light source 4 illuminates overhead illuminated area 222, and thus it is possible to increase the visibility at a distant during night-time when daytime light source 4 is turned on during night-time, for example. In particular, it is possible to increase the visibility at a distance in front of automobile 100 by turning on daytime light source 4 when night-time low beam light source 2 is ON.

In addition, daytime light source 4, for example, is disposed on at least part of a periphery of night-time low beam light source 2 according to the embodiment.

With this, since daytime light source 4 and night-time low beam light source 2 can be closely disposed, it is possible to miniaturize lighting apparatus 1. Furthermore, it is possible to make glare less perceived by disposing daytime light source 4 in a vicinity of night-time low beam light source 2 having a high luminance. Accordingly, it is possible to allow a pedestrian, etc., to easily recognize the width of vehicle body 100, leading to a higher safety.

In addition, according to the embodiment, daytime light source 4 emits less light when night-time low beam light source 2 is ON than when night-time low beam light source 2 is OFF.

With this, it is possible to suppress the luminance during night-time and prevent emitting light with glare more than necessary while securing a luminance of daytime light source 4 as a daytime lighting. Accordingly, it is possible, for example, to increase the visibility at a distance with a brightness that falls within the range specified by law or the like.

Moreover, according to the embodiment, the S/P ratio of light emitted from daytime light source 4 is at least 2.0, for example.

With this, the so-called Purkinje phenomenon allows human eyes to perceive the light as brighter in overhead illuminated area 222 and in a vicinity thereof. Accordingly, it is possible, for example, to increase the visibility at a distance even with a brightness that falls within the range specified by law or the like.

In addition, according to the embodiment, daytime light source 4 includes: first light-emitting device 61b; and second light-emitting device 61b having an S/P ratio higher than an S/P ratio of first light-emitting device 61a, and second light-emitting device 61b emits light when night-time low beam light source 2 is ON.

With this, it is possible to perform suitable lighting both during daytime and during night-time, by including first light-emitting device 61a that is suitable to daytime lighting and second light-emitting device 61b that is suitable to night-time lighting. Accordingly, it is possible to increase the visibility at a distance while suppressing power consumption by the light source.

In addition, according to the embodiment, automobile 100 further includes, for example, alert unit 160 which provides an alert to a driver of automobile 100 in the case where daytime light source is OFF when night-time low beam light source 2 is ON.

With this, it is possible to alert the driver that daytime light source 4 is OFF in the case where daytime light source 4 fails to emit light when night-time low beam light source 2 is ON. For example, when night-time low beam light source 2 is ON, it is difficult for a driver to determine whether or not daytime light source 4 is ON. Thus, by alerting the driver in the above-described case, it is possible to instantaneously notify the driver of a malfunction of lighting apparatus 1.

Other Variations

Although the lighting apparatus and automobile according to the present disclosure are described based on the above-described embodiment, the present disclosure is not limited to the above-described embodiment.

For example, although daytime light source 4 is caused to emit less light by turning off first light-emitting device 61a during night-time according to the above-described embodiment, the way of causing daytime light source 4 to emit less light is not limited to this. For example, when daytime light source 4 includes only one type of light-emitting device (second light-emitting device 61b, for example), daytime light source 4 may be caused to emit less light by adjusting the amount of light emitted by the light-emitting device.

For example, daytime light source 4 may be caused to emit less light by performing AC driving on daytime light source 4 during night-time while performing DC driving on daytime light source 4 during daytime for 100% light emission. More specifically, it is possible to cause daytime light source 4 to emit less light during night-time by controlling a period of time for supplying a current to the light-emitting device in a predetermined period. For example, a current is supplied only in a period of 30% of a predetermined period during night-time, thereby allowing emitting light with a luminance of 30% of a luminance during daytime. Alternatively, daytime light source 4 may be caused to emit less light during night-time by reducing the amount of current to flow into light-emitting device.

In addition, in the above-described embodiment, night-time low beam light source 2, daytime light source 4, and night-time high beam light source 3 are exemplified as being separately configured, for example, however, night-time low beam light source 2, daytime light source 4, and night-time high beam light source 3 may be integrally configured. With this configuration, it is possible to further miniaturize lighting apparatus 1.

In addition, in the above-described embodiment, night-time low beam light source 2 and daytime light source 4 are exemplified as being integrally configured, for example, however, night-time low beam light source 2 and daytime light source 4 may be configured separately.

Moreover, for example, in the above embodiment, automobile 100 is exemplified as including two lighting apparatuses 1 (two headlights 120), but automobile 100 is not limited to this example. For example, automobile 100 may include three or more lighting apparatuses 1, such as two lighting apparatuses 1 on the right side of vehicle body 110 and two lighting apparatuses 1 on the left side of vehicle body 110, and, alternatively, may include only one lighting apparatus 1.

Moreover, in the above embodiment, the light-emitting device is exemplified as being an LED, but the light-emitting device may be a semiconductor light-emitting device such as a semiconductor laser, or a light-emitting device such as an organic electroluminescent (EL) device, or a non-organic EL device.

In addition, in the above-described embodiment, a four-wheeled vehicle is exemplified as automobile 100, for example, however, other automobiles such as a two-wheeled vehicle may be employed.

It should be noted that the present disclosure also includes other forms in which various modifications apparent to those skilled in the art are applied to the embodiment or forms in which structural elements and functions in the embodiment are arbitrarily combined within the scope of the present disclosure.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting apparatus for a vehicle, comprising:
a night-time low beam light source which mainly illuminates a lower front region in front of the vehicle; and
a daytime light source which mainly illuminates an overhead region that is an upper region above the lower front region.

2. The lighting apparatus according to claim 1,
wherein the daytime light source is disposed on at least part of a periphery of the night-time low beam light source.

3. The lighting apparatus according to claim 1,
wherein the daytime light source emits less light when the night-time low beam light source is ON than when the night-time low beam light source is OFF.

4. The lighting apparatus according to claim 1,
wherein an S/P (scotopic vision luminance/photopic vision luminance) ratio of light emitted by the daytime light source is at least 2.0.

5. An automobile comprising:
the lighting apparatus according to claim 1; and
a vehicle body including the lighting apparatus in a front portion.

6. The lighting apparatus according to claim 1, further comprising:
a plurality of the daytime light source.

7. The lighting apparatus according to claim 6, wherein the plurality of the daytime light source surround the night-time low beam light source.

8. The lighting apparatus according to claim 7, wherein the plurality of the daytime light source annularly surround the night-time low beam light source.

9. The lighting apparatus according to claim 7, wherein the plurality of the daytime light source is evenly spaced about the night-time low beam light source.

10. The lighting apparatus according to claim 7, wherein the plurality of the daytime light source includes a first light-emitting device and a second light-emitting device different than the first light-emitting device.

11. The lighting apparatus according to claim 10, wherein the first light-emitting device and the second light-emitting device are alternately disposed about the night-time low beam light source.

12. The lighting apparatus according to claim 11, wherein the first light-emitting device and the second light-emitting device are alternately disposed about the night-time low beam light source at regular intervals.

13. The lighting apparatus according to claim 10, wherein the first light-emitting device includes a blue LED chip and a first yellow phosphor, and
the second light-emitting device includes a blue LED chip and a pair of second yellow phosphors, each of the pair of the second yellow phosphors being different than the first yellow phosphor.

14. The lighting apparatus according to claim 10, wherein the first light-emitting device and the second light-emitting device are configured to emit light at different times.

15. The lighting apparatus according to claim 14, wherein the second light-emitting device is configured to emit light when the night-time low beam light source illuminates the lower front region in front of the vehicle.

16. The lighting apparatus according to claim 7, wherein the plurality of the daytime light source is evenly and circumferentially spaced about the night-time low beam light source.

17. The lighting apparatus according to claim 6, wherein the plurality of the daytime light source at least partially surround the night-time low beam light source.

18. The lighting apparatus according to claim 6, wherein a pair of the plurality of the daytime light source is disposed opposite the night-time low beam light source, with the night-time low beam light source being between the pair of the plurality of the daytime light source.

19. A lighting apparatus for a vehicle, comprising:
a night-time low beam light source which mainly illuminates a lower front region in front of the vehicle; and
a daytime light source which mainly illuminates an overhead region that is an upper region above the lower front region, wherein the daytime light source includes:
  a first light-emitting device; and
  a second light-emitting device having an S/P ratio higher than an S/P ratio of the first light-emitting device, and the second light-emitting device emits light when the night-time low beam light source is ON.

20. An automobile, comprising:

a lighting apparatus including a night-time low beam light source and a daytime light source;

a vehicle body including the lighting apparatus in a front portion; and at least one of a processor or a circuit configured to provide an alert to a driver of the automobile in the case where the daytime light source is OFF when the night-time low beam light source is ON, wherein the night-time low beam light source mainly illuminates a lower front region in front of the automobile, and the daytime light source mainly illuminates an overhead region that is an upper region above the lower front region.

\* \* \* \* \*